United States Patent [19]

Rodgers

[11] Patent Number: 5,042,970
[45] Date of Patent: Aug. 27, 1991

[54] FAST RECHARGE COMPRESSOR

[75] Inventor: Colin Rodgers, San Diego, Calif.

[73] Assignee: Sundstrand Corporation, Rockford, Ill.

[21] Appl. No.: 443,245

[22] Filed: Nov. 28, 1989

[51] Int. Cl.$^5$ .................. F04B 17/00; F02C 7/26
[52] U.S. Cl. .................. 417/406; 417/243; 60/39.142
[58] Field of Search ............ 60/39.142, 39.141, 39.07, 60/727, 39.183, 39.15; 417/243, 406; 415/179

[56] References Cited

U.S. PATENT DOCUMENTS

| | | | |
|---|---|---|---|
| 2,280,765 | 4/1942 | Anxionnaz et al. | 69/41 |
| 2,793,019 | 5/1957 | Baumann | 60/39.183 |
| 2,959,919 | 11/1960 | Chiera | 60/39.142 |
| 3,216,648 | 11/1965 | Ford | 417/243 |
| 3,355,096 | 11/1967 | Hornshuch | 415/179 |
| 3,585,795 | 6/1971 | Grieb | 60/39.16 |
| 3,792,499 | 7/1975 | Strub | 415/179 |
| 3,795,458 | 3/1974 | Strub | 415/149 |
| 3,809,493 | 5/1974 | Pilarczyk | 415/199 |
| 3,912,000 | 10/1975 | Nyeste | 165/47 |
| 3,949,548 | 4/1976 | Lockwood, Jr. | 60/39.15 |
| 4,057,371 | 11/1977 | Pilarczyk | 417/409 |
| 4,196,773 | 4/1980 | Trumpler | 165/62 |
| 4,431,371 | 2/1984 | Thomson | 415/116 |
| 4,514,976 | 5/1985 | Christoff | 60/39.07 |
| 4,712,371 | 12/1987 | Weber | 60/39.142 |
| 4,751,814 | 6/1988 | Farrell | 60/39.183 |

*Primary Examiner*—Leonard E. Smith
*Assistant Examiner*—Peter Korytnyk
*Attorney, Agent, or Firm*—Wood, Phillips, Mason, Recktenwald & VanSanten

[57] ABSTRACT

Time lost in recharging compressed gas storage bottles on board aircraft is minimized with a fast recharge compressor (20) for rapidly providing compressed gas (30) having a housing (24) with a gas inlet (26), a shaft (46) within the housing (24) on which is mounted a turbine (34) and a multi-stage compressor (36). The turbine (34) is designed to run the shaft (46) and thereby the multi-stage compressor (36). Entering gas is divided into two streams and one stream (28) is directed through the turbine (34) while the other stream (30) is directed through the compressor stages (38,40,44). Heat is exchanged between the two streams by heat exchangers (52,54,56,57,60) after the expansion stream (28) has passed through the turbine (34) so as to cool the compression stream (30).

12 Claims, 2 Drawing Sheets

FAST RECHARGE COMPRESSOR

DESCRIPTION

1. Field of the Invention

The present invention generally relates to compressors and more particularly is concerned with a compact fast recharge rotary compressor which can quickly provide compressed gas and is especially useful in an aircraft power system.

2. Background of the Invention

On modern aircraft, auxiliary or emergency power units are provided for a number of reasons. One of the main reasons for including an auxiliary power unit is for starting the main turbine engines of the aircraft. The auxiliary power units also provide electrical and/or hydraulic power to the aircraft when the main engines are shut down which may be of vital necessity in so-called fly-by-wire aircraft upon encountering engine shut down.

The auxiliary power units are frequently small gas turbines which require pressurized gas, such as compressed air or gases of combustion from an auxiliary combustor, for startup so that the main turbine engines may in turn be started.

Conventionally, compressed air or oxidant is stored under pressure in tanks or vessels. The compressed air or oxidant, which may typically be at pressures in the range of 1000 psig, is passed through the power unit's turbine blades for startup or to an auxiliary combustor to oxidize fuel and provide gases of combustion which are then directed against the turbine blades. Once startup has been completed, the vessel's supply of compressed air or oxidant may be wholly or partially depleted. As can be appreciated, it is imperative that a full charge of compressed air be available to assure the ability to complete the next starting attempt.

One alternative for providing a full charge of compressed air is to provide extra or larger storage vessels on the aircraft which hold enough gas to provide several starts. Of course, this is most undesirable in aircraft where space and weight constraints are known to be of critical concern.

Another alternative is to recharge the vessels with high pressure air generated from multi-stage reciprocating compressors However, these compressors have low flow capability and are also relatively bulky, thus resulting in weight and space problems as well. Because of the low flow capability, the aircraft must either be delayed in takeoff so that the recharging of the vessels may be completed or completion of the recharging of the vessels must wait until after takeoff. Either alternative is undesirable.

The present invention is directed to overcoming one or more of the above problems.

SUMMARY OF THE INVENTION

It is a principal object of this invention to provide a new and improved compact fast recharge compressor which can quickly provide compressed gas or air and is especially useful for use in an aircraft power system.

The principal object of this invention is achieved in a compressor which is more compact and lighter than conventionally used reciprocating compressors. The compressor includes a housing having a gas inlet, a shaft within the housing and an expansion turbine and a multi-stage rotary compressor mounted on the shaft. The turbine drives the shaft and thereby the multi-stage compressor. Further, the compressor includes means in said housing for dividing the gas entering the housing into two streams. One stream is directed through the turbine while the other stream is directed to the compressor and its stages. There are also means in the housing for exchanging heat between the cooler expanded turbine exhaust and the compression stream. The compressor can rapidly provide high pressure air which may be used to recharge the storage vessels contained on the aircraft for later starting of the main turbine engines via the auxiliary power unit.

The compressor also may provide means for exchanging heat between the two streams at different stages of compression within the compressor. In a preferred embodiment, the expanded turbine exhaust may be used to precool the stream directed to the compressor before it enters the compressor. In another preferred embodiment, the turbine exhaust may cool the compressed stream after subsequent compressor stages. By precooling or cooling the stream directed through the compressor, the volume of the compression stream is reduced to maximize compressor efficiency. Air at high pressures is thus provided quickly.

In use in an aircraft power system, the fast recharge compressor will allow recharging to be completed while the aircraft is taxiing so that before taking off the aircraft will have a full charge of compressed gas or air for an emergency start or, if required, to reinitiate start of the main engines before takeoff. This will also allow the aircraft pilot to minimize the time between startup and takeoff.

By providing a compact fast recharge compressor, the bulky, slow, reciprocating compressors may be eliminated thereby also eliminating weight on the aircraft. Further, the number and/or volume of pressurized vessels may be reduced since one need not store enough pressurized gas for more than one start.

Other objects and advantages will become apparent from the following descriptions and accompanying drawings.

DESCRIPTION OF THE PREFERRED EMBODIMENT

The preferred embodiment of the invention is a compact compressor for rapidly providing compressed gas and which is especially useful on aircraft requiring a source of stored compressed gas or air.

Figure 1:
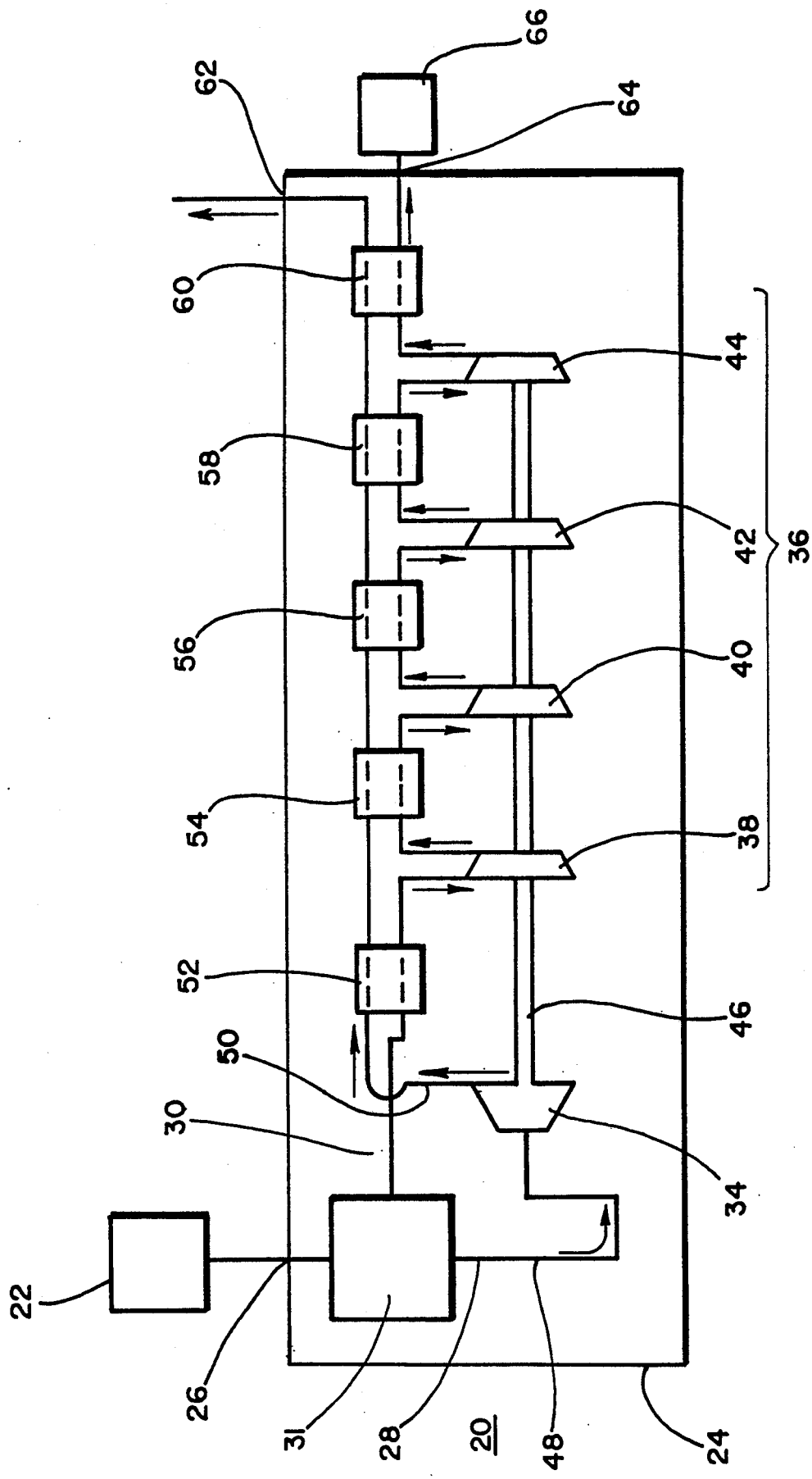
FIG. 1 is a schematic diagram of the recharge compressor of the present invention.

Referring now to the drawings, and more particularly to FIG. 1, there is shown a schematic diagram of a fast recharge compressor indicated generally at 20. A source of bleed air 22 is illustrated in FIG. 1. As an example, when used on an aircraft, the bleed air source 22 may be either an auxiliary power unit or the main turbine engines used for propulsion. Typically, the bleed air from the source 22 is at a medium pressure, or approximately 50 psig.

The bleed air enters a compressor housing 24 at a gas inlet 26. Bleed air entry is facilitated not only by reason of its pressurized state but also by reason of the increased pressure differential that results from compressor suction when the compressor 20 is operating.

After entering the housing 24, the bleed air is divided into two streams 28,30 by any suitable means, shown schematically at 31. One stream 28 will be passed through and drive a high speed expansion turbine 34 while the second stream 30 will be compressed in a multi-stage compressor, designated generally as 36, having four stages 38,40,42,44.

The turbine 34 and the multi-stage compressor 36 are mounted on a common drive shaft 46 although separate but coupled shafts could be used if desired. The turbine 34 drives the shaft 46 and consequently the multi-stage compressor 36. The illustrated arrangement provides for a more compact compressor.

The expansion stream 28 is passed through a conduit 48 and through the turbine 34 and is expanded therein, lowering its temperature, and is exhausted from the turbine 34 through a conduit 50. The expansion stream 28 is used to precool the compression stream 30 before the compression stream 30 enters the first compressor stage 38 by means in the housing for exchanging heat in the form of a heat exchanger shown schematically at 52.

The expansion stream 28 exits the heat exchanger 52 at an increased temperature, while the precooled compression stream 30 exits the heat exchanger 52 and enters the first compressor stage 38 and is exhausted from the compressor stage 38 at both a higher pressure and temperature. The streams 28,30 then enter a second heat exchanger 54 wherein the expansion stream 28 is further heated and the compression stream 30 is further cooled.

The compression stream 30 then enters the second compressor stage 40 and exits at a higher pressure and temperature. The streams 28,30 then exchange heat in a third heat exchanger 56 wherein the expansion stream 28 is heated while the compression stream 30 is cooled.

The compression stream 30 then enters the third compressor stage 42 and exits at a higher temperature and pressure. The streams 28,30 exchange heat in a fourth heat exchanger 58, the expansion stream 28 is heated while the compressor stream 30 is cooled.

The compression stream 30 then enters the fourth and final compressor stage 44 and exits at a higher temperature and pressure. The streams 28,30 exchange heat in a fifth heat exchanger 60, the expansion stream 28 is heated and thereafter passes through an exhaust 62 in the housing 24. The compression stream 30 is cooled and thereafter exits the housing 24 via a high pressure exit 64. The compression stream can then be directed where needed such as to a pressurized gas storage vessel 66 which requires recharging.

Figure 2:
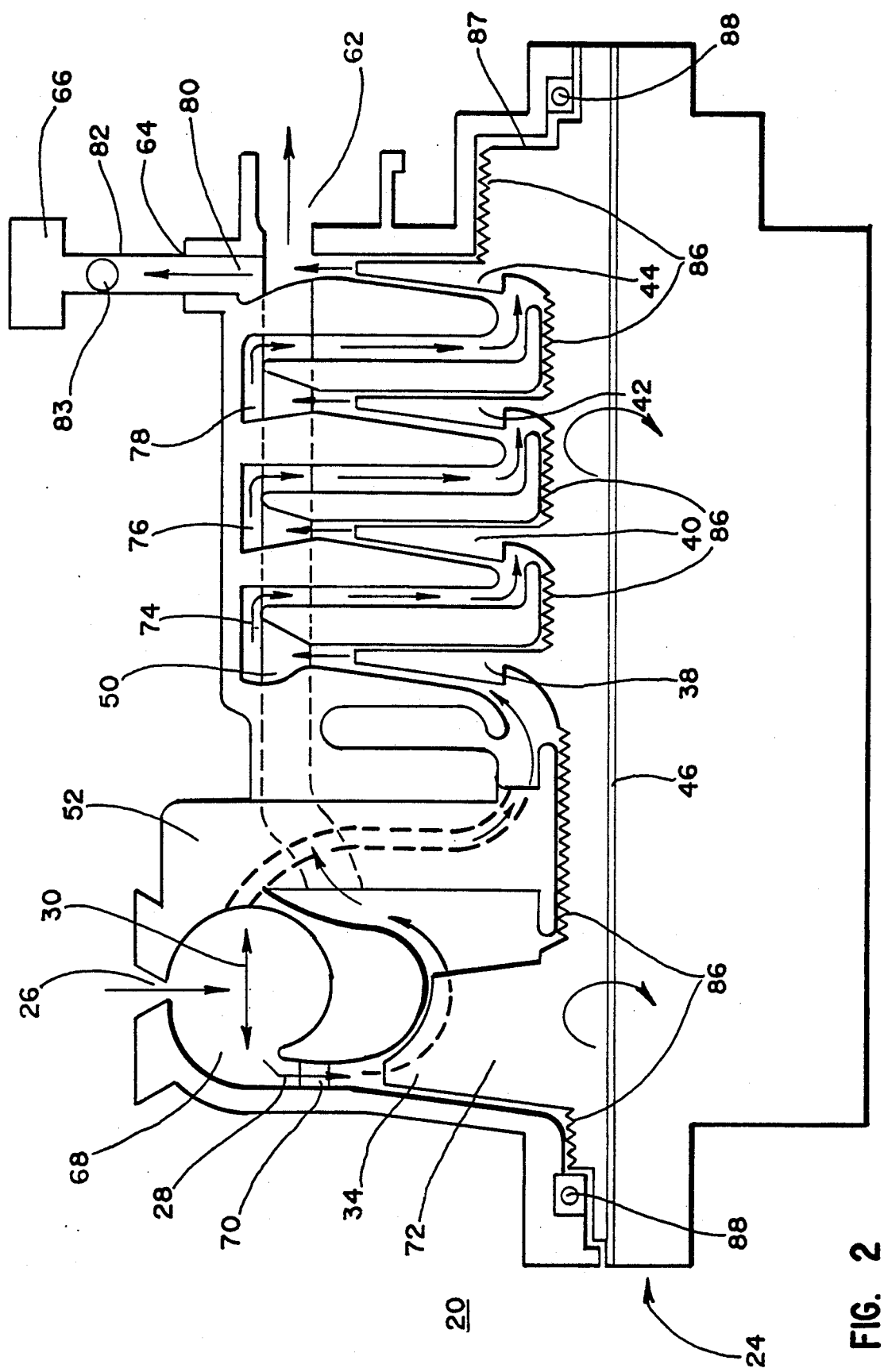
FIG. 2 is a somewhat schematic sectional view of a recharge compressor made in accordance with the invention.

Referring now to FIG. 2, there is shown a physical embodiment of the invention. Since many of the components have already been described in connection with FIG. 1, they will not be redescribed in the interest of brevity, it being understood that like components bear like reference numbers.

The housing 24 includes a volute or plenum 68 in fluid communication with the gas inlet 26 and having an nozzle 70. The turbine 34 is a radial turbine having blades 72 located to receive gas from the nozzle 70 and be driven thereby.

After passing by the turbine blades 72, the expansion stream 28 then passes into the heat exchanger 52 which is a conduit containing the compression stream 30. The heat exchanger 52 is designed so as to maximize heat exchange between the cooler expansion stream 28 and the compression stream 30. The expansion stream 28 is thereafter directed into the conduit 50 while the compression stream 30 passes through the first compressor stage 38 and into a first diffuser area 74.

The conduit 50 carrying the expansion stream 28 passes through the first diffuser area 74 such that the expansion stream 28 will cool the warmer compression stream 30. The conduit 50 is designed in any known fashion to maximize heat transfer in the diffuser area 74 between the expansion stream 28 and the compression stream 28 and thus serves as the heat exchanger 54.

The compression stream 20 passes through the second, third and fourth compression stages 40,42,44, respectively, and each time after passing through a compressor stage, the compression stream 30 enters a diffuser area 76, 78,80, respectively, in which the compression stream 30 comes in contact with the conduit 50, which serves as one heat exchange fluid path in each of the heat exchangers 56,58,60, respectively, and exchanges heat with the expansion stream 28, thus cooling the compression stream 30 after it leaves the compressor stages.

Means for delivering the compressed air from the compressor 20 to the compressed air storage vessel 66 in an aircraft are also provided in the form of a pipe 82 having one way flow valve or check valve 83.

In the embodiment of the invention illustrated by FIG. 2, a thrust balance piston 84 is provided on the high pressure end of the shift 46. The thrust balance piston 84 is provided so as to balance the compressor 20 as against thrust produced by the operation of the compressor 20. Specifically, labyrinth seals 86 allow the high pressure gas to exert a balancing force against a surface 87 of the piston 84. Further, ball bearings 88 are included so as to also aid the compressor 20 retain its balance. Air bearings may also be used effectively in place of the ball bearings 88.

The number of stages used in the examples are not to be interpreted as determinative of the number of compressor stages that may be used, as more or less may be used, depending on the situation. Further, while in the illustrations the flows of the two streams are concurrent, it is within the scope of this invention to provide the streams in countercurrent flow.

The compressor in the invention is designed for fast recharge, and power consumption is not a concern. For example, a taxiing aircraft has abundant power to spare which may be conveyed as bleed air to drive the compressor 20 and rapidly recharge a storage vessel such that take off need not be delayed to accommodate such recharging. The shaft rotates generally at around 100,000 RPM when operating and compressed air is produced at approximately 1000 psig.

The compressor as disclosed provides high pressure gas at a rapid rate. The configurations are such that bulkiness or weight is minimized due to the compact configuration, thus avoiding the weight and space penalties of providing extra storage vessels for compressed gas or using reciprocating compressors.

I claim:
1. A compressor for rapidly providing compressed air, comprising:
   a housing having a bleed air inlet;
   a shaft within said casing;
   a high-speed expansion turbine mounted on said shaft to drive said shaft;
   a compressor having plural stages mounted on said shaft to be driven thereby;

means in said housing for dividing bleed air entering said housing through said inlet into first and second streams of air;

means in said housing for directing said first stream of air through said turbine;

means in said housing for directing said second stream of air through said compressor;

first means in said housing for exchanging heat between said first and second streams of air before said second stream of air enters a first compressor stage and after said first stream of air has passed through said turbine; and second means in said housing for exchanging heat between said first and second streams of air after at least some compressor stages.

2. The compressor as recited in claim 1 wherein said first and second streams are in concurrent flow relation.

3. A compressor for rapidly providing compressed gas, comprising:

a housing having a gas inlet;

a shaft within said housing;

an expansion turbine mounted on said shaft to drive said shaft;

a compressor having plural stages mounted on said shaft to be driven thereby;

means for dividing gas entering said housing through said inlet into first and second streams of gas and directing said first stream of gas through said turbine while directing said second stream of gas through said compressor; and means in said housing for exchanging heat between said first and second streams of gas after said first stream of gas has passed through said turbine.

4. The compressor as recited in claim 1 further including means in said housing for exchanging heat between said first and second streams of gas after at least some compressor stages.

5. The compressor as recited in claim 3 wherein said first and second streams are in concurrent flow relation.

6. The compressor as recited in claim 3 wherein labyrinth seals are located on said shaft between said compressor stages.

7. The compressor as recited in claim 6 wherein means are included on said shaft for balancing loading said shaft.

8. An aircraft power system, comprising:

a compressed air storage vessel;

an auxiliary power unit requiring compressed gas from said vessel for operation;

a source of bleed air;

a compressor for rapidly providing compressed air for recharging said compressed air source comprising:

a housing having an inlet for said bleed air;

a shaft within said housing;

an expansion turbine mounted on said shaft to drive said shaft;

a compressor having plural stages mounted on said shaft to be driven thereby;

means in said housing for dividing said bleed air into first and second streams of air and directing said first stream of air through said turbine and said second stream of air through said compressor;

means in said housing for exchanging heat between said first and second streams of air after said first stream of air has passed through said turbine;

means for delivering said compressed air from said compressor to said compressed air storage vessel.

9. The aircraft power system as recited in claim wherein the compressor further includes second means in said housing for exchanging heat between said first and second streams of air after at least some compressor stages.

10. The compressor as recited in claim 9 wherein the streams of air are in concurrent flow relation.

11. The compressor as recited in claim 8 wherein labyrinth seals are located on said shaft between said compressor stages.

12. The compressor as recited in claim 11 wherein included on said shaft are means for balancing loading said shaft.

* * * * *